United States Patent [19]
Ponte

[11] Patent Number: 5,925,115
[45] Date of Patent: Jul. 20, 1999

[54] METHOD AND SYSTEM FOR EXTENDING INTERRUPT SOURCES AND IMPLEMENTING HARDWARE BASED AND SOFTWARE BASED PRIORITIZATION OF INTERRUPTS FOR AN EMBEDDED PROCESSOR

[75] Inventor: Christian Ponte, La Colle sur Loop, France

[73] Assignee: VLSI Technology, Inc., San Jose, Calif.

[21] Appl. No.: 08/814,568

[22] Filed: Mar. 10, 1997

[51] Int. Cl.$^6$ .............................. G06F 13/24; G06F 13/26
[52] U.S. Cl. ................................ 710/50; 710/8; 710/128; 710/260; 710/266; 712/40
[58] Field of Search ...................................... 395/308, 739, 395/733, 870, 800.4, 828, 830, 834, 838; 710/128, 266, 260, 50, 40, 8, 10, 14, 18

[56] References Cited

U.S. PATENT DOCUMENTS

| | | | |
|---|---|---|---|
| 3,986,170 | 10/1976 | Valassis et al. | 340/172.5 |
| 5,687,381 | 11/1997 | Swanstrom et al. | 395/742 |
| 5,721,931 | 2/1998 | Gephardt et al. | 395/733 |
| 5,727,227 | 3/1998 | Schmidt et al. | 395/800 |
| 5,778,236 | 7/1998 | Gephardt et al. | 395/739 |
| 5,778,242 | 7/1998 | Wang | 395/800.4 |

*Primary Examiner*—Thomas C. Lee
*Assistant Examiner*—Rehana Perveen

*Attorney, Agent, or Firm*—Wagner Murabito & Hao

[57] ABSTRACT

The present invention comprises and interrupt controller for use with a programmable digital processor system. The interrupt controller of the present invention includes a plurality of interrupt blocks. The interrupt blocks are used for coupling to a corresponding plurality of peripheral devices. Each of the interrupt blocks are coupled to a data bus included within the interrupt controller. The interrupt controller also includes an interrupt control register. The interrupt control register is coupled to each of the interrupt blocks, and upon receiving an internal interrupt request from any of the interrupt blocks, asserts a processor interrupt request responsive to the internal interrupt request. The interrupt controller includes a processor interrupt request line adapted to couple to a programmable digital processor. The interrupt control register is coupled to the processor interrupt request line and asserts the processor interrupt request to an interrupt input of the programmable digital processor via the processor interrupt request line. The interrupt controller further includes an interrupt acknowledge line adapted to couple to the programmable digital processor. The interrupt acknowledge line is coupled to the input blocks to convey an interrupt acknowledge signal from the programmable digital processor to the interrupt blocks. The interrupt acknowledge signal is conveyed to the interrupt blocks such that each of the peripheral devices efficiently share the interrupt request input of the programmable digital processor.

25 Claims, 6 Drawing Sheets

METHOD AND SYSTEM FOR EXTENDING INTERRUPT SOURCES AND IMPLEMENTING HARDWARE BASED AND SOFTWARE BASED PRIORITIZATION OF INTERRUPTS FOR AN EMBEDDED PROCESSOR

TECHNICAL FIELD

The present invention pertains to interrupt systems for programmable digital devices. More particularly, the present invention relates to a system for extending the limited number of interrupts available in a programmable digital processor to accommodate multiple interrupting peripherals.

BACKGROUND ART

Many devices common to every day life utilize complex integrated circuits. Examples include desktop computer systems, video games, vending machines, and even pay phones. These devices often include programmable digital processors embedded within their systems. The digital processors typically implement any required user interface (e.g., a menu of choices) and execute the actual electronic processing required to implement user requests (e.g., place a phone call or order a service). The more complicated and sophisticated the device, the more complex the system including the programmable digital processor.

Programmable digital processor systems operate by executing programs, or a series of instructions, stored in a memory. These programs and series of instructions are collectively referred to as software. Software is what makes the systems function and perform useful tasks. The utility of such a system often hinges upon the speed and efficiency with which the system executes the software program. Hence, it is desirable that the programmable digital processor of the system execute software programs as fast as possible. As the programmable digital processor executes a program, there may be several significant events occurring in the system's peripheral device hardware. It is often necessary to signal the programmable digital processor to respond to an external condition, even though it is currently executing a program. This signaling process is referred to as an interrupt.

Interrupts are changes in the flow of software execution not caused by the currently running program. Some other process, usually input or output related, is responsible for the change in the flow of execution. For example, a program may instruct a peripheral device coupled to the computer system to begin a data transfer and to provide an interrupt as soon as the data transfer is complete. The interrupt stops the currently executing program and transfers control to an interrupt service routine (ISR) which performs some appropriate action. When finished, the ISR returns control of the programmable digital processor to the interrupted program. The programmable digital processor subsequently restarts the interrupted program in the same state it was in when the interrupt occurred.

The need for interrupts arise from the fact that, in most cases, input and output (IO) can proceed in parallel with processor execution. On computers where the processor issues an IO instruction and then stops to wait for the IO to be completed, there is no need for an interrupt. When the IO is finished, the processor is restarted at the instruction following the IO instruction. Because the processor can generally execute many hundreds of thousands, or even millions, of instructions during the time required to complete a single IO instruction, it is very wasteful to force the processor to be idle during this time. Interrupts and interrupt subsystems allow the processor to execute the program concurrently with the IO and be signaled as soon as the IO is completed.

Prior Art FIG. 1 shows a programmable digital processor system 100 in accordance with the prior art. System 100 includes a DSP (digital signal processor) 101 coupled to a memory 102, a first peripheral device 103, and a second peripheral device 104 via a bus 107. DSP 101 includes two interrupt request inputs, INTA and INTB, which are respectively coupled to device 104 and 103 via lines 106 and 105.

As described above, system 100 functions by DSP 101 executing a program stored in memory 102. The instructions comprising the program are sequentially fetched from memory 102 via bus 107. Device 103 and device 104 provide for user input and output (e.g., device 103 accepts keypad inputs and device 104 drives a display screen). When either device 103 or device 104 requires service from DSP 101 (e.g., impending buffer overflow, ready to accept next frame of data, or the like), an interrupt request is asserted to either INTA or INTB via lines 106 or 105. DSP 101 subsequently interrupts the currently executing program and jumps to the address in memory 102 for the particular ISR for either device 103 (e.g., in the case of an assertion on INTB) or device 104 (e.g., in the case of an assertion on INTA). Where both device 103 and device 104 concurrently assert interrupt requests, DSP 101 jumps to the appropriate ISR based upon the programmable priority between INTA and INTB. For example, where DSP 101 is programmed such that INTA is of a higher priority than INTB, the ISR corresponding to INTA is executed before the ISR corresponding to INTB.

There is a problem however, in that DSP 101 (as is typical of many DSPs) has only a limited number of interrupt request inputs. This limits the number of peripheral devices able to utilize the time saving features of interrupts. Complex DSP devices often have a large number of peripherals and perform much faster when each peripheral device couples to its corresponding interrupt request input. Similarly, in order to maintain speed and responsiveness, the number of peripherals coupled to a DSP (e.g., DSP 101) is limited to the number of interrupt request inputs included in the DSP.

Thus what is required is a method and system for expanding the number of peripherals able to efficiently couple to a programmable digital processor having a limited number of interrupt request inputs. The required system should be compatible with the large number of programmable digital processors in the electronics industry. Additionally, the required system should be modular and easily expandable. The system of the present invention provides a novel solution to the above requirements.

DISCLOSURE OF THE INVENTION

The present invention provides a method and system for expanding the number of peripheral devices able to efficiently couple to a programmable digital processor system having a limited number of interrupt request inputs. The system of the present invention is compatible with the large number of programmable digital processors in the electronics industry. In addition, the present invention is modular and is easily expanded to accommodate increasing numbers of peripheral devices.

The present invention comprises a modular interrupt controller for use with a programmable digital processor system. The interrupt controller of the present invention includes a plurality of interrupt blocks. The interrupt blocks are used for coupling to a corresponding plurality of peripheral devices. Each of the interrupt blocks are coupled to a data bus included within the interrupt controller. The interrupt controller also includes an interrupt control register. The interrupt control register is coupled to each of the interrupt blocks. The interrupt control register, upon receiving an internal interrupt request from any of the interrupt blocks, asserts a processor interrupt request responsive to the internal interrupt request. The interrupt controller couples to a processor interrupt request line adapted to couple to a programmable digital processor. The interrupt control register, coupled via the processor interrupt request line, asserts the processor interrupt request to an interrupt input of the programmable digital processor. The interrupt controller further includes an interrupt acknowledge line adapted to couple to the programmable digital processor. The interrupt acknowledge line is coupled to the input blocks of the modular interrupt controller such that an interrupt acknowledge signal from the programmable digital processor cascades from interrupt block to interrupt block until it is received by the appropriate interrupt block.

When the interrupt acknowledge is received by the appropriate interrupt block, that interrupt block provides a vector to an interrupt service routine to the programmable digital processor. This vector is specific to the peripheral device coupled to the particular interrupt block and causes the programmable digital processor to service the particular interrupt request. In this manner, the interrupt acknowledge signal is conveyed to the interrupt blocks such that each of the peripheral devices efficiently share the interrupt request input of the programmable digital processor, thus efficiently extending the number of peripheral devices supported in the system.

BRIEF DESCRIPTION OF THE DRAWINGS

The present invention is illustrated by way of example and not by way of limitation, in the figures of the accompanying drawings and in which like reference numerals refer to similar elements and in which.

Prior Art

BEST MODE FOR CARRYING OUT THE INVENTION

A modular interrupt controller is disclosed. In the following description, for the purposes of explanation, numerous specific details are set forth in order to provide a thorough understanding of the present invention. It will be obvious, however, to one skilled in the art that the present invention may be practiced without these specific details. In other instances, well-known structures, devices, and processes are shown in block diagram form in order to avoid unnecessarily obscuring the present invention.

The present invention comprises a modular interrupt controller for use with a programmable digital processor system. The modular interrupt controller of the present invention provides a method and system for expanding the number of peripheral devices able to efficiently couple to a programmable digital processor system having a limited number of interrupt request inputs. The modular interrupt controller is compatible with the large number of programmable digital processors in the electronics industry. In addition, the modular interrupt controller of the present invention is provides an easily expandable system able to accommodate differing numbers of peripheral devices. The modular interrupt controller couples to a programmable digital processor and a number of peripheral devices. Using the system of the present invention, a large number of peripheral devices are able to effectively and efficiently share a limited number of interrupt request inputs (e.g., as few as one) typically built into most programmable digital processors. The present invention and its benefits are described in greater detail below.

Figure 1:
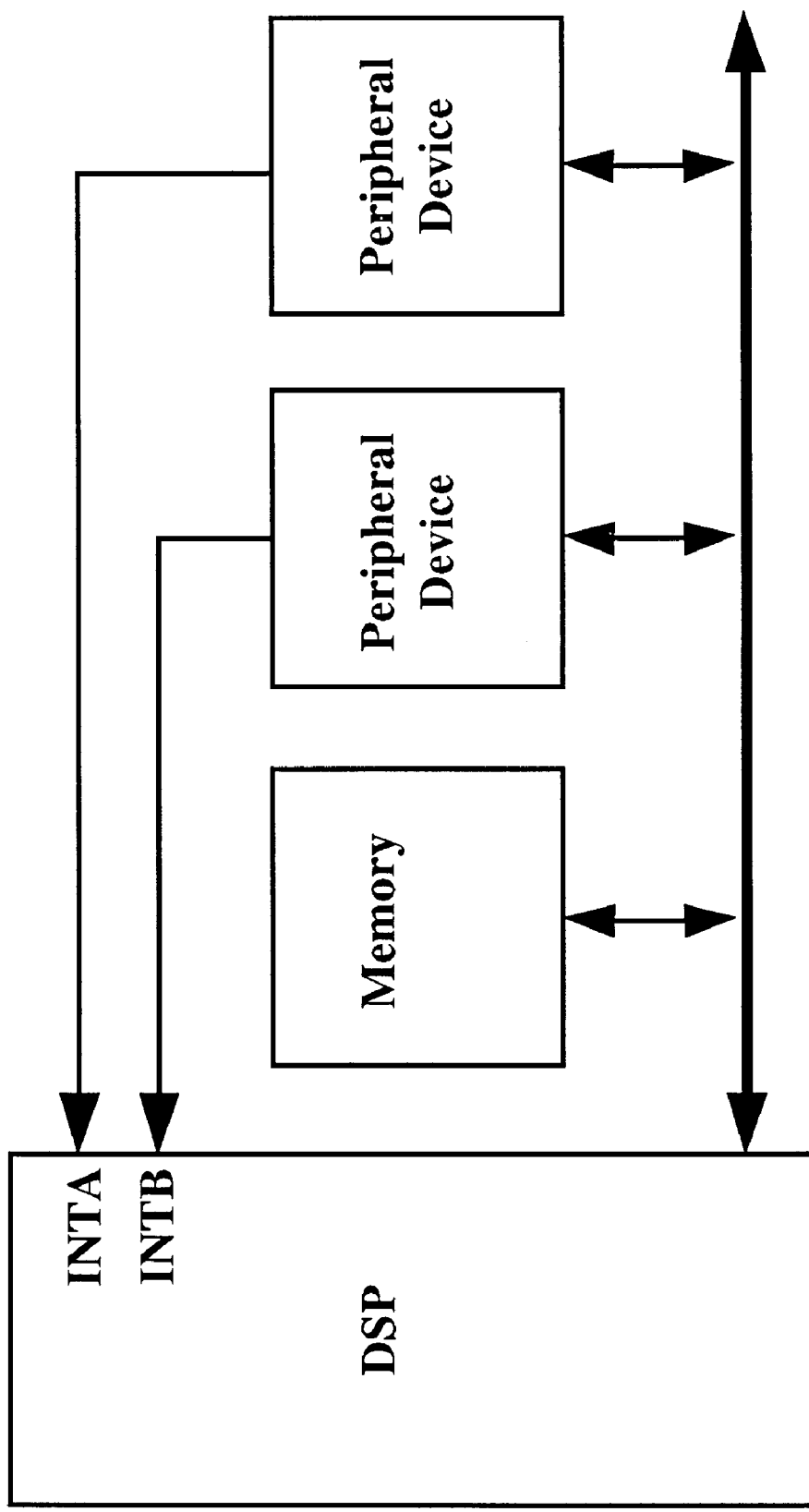
FIG. 1 shows a programmable digital processor system in accordance with the prior art.
Figure 2:
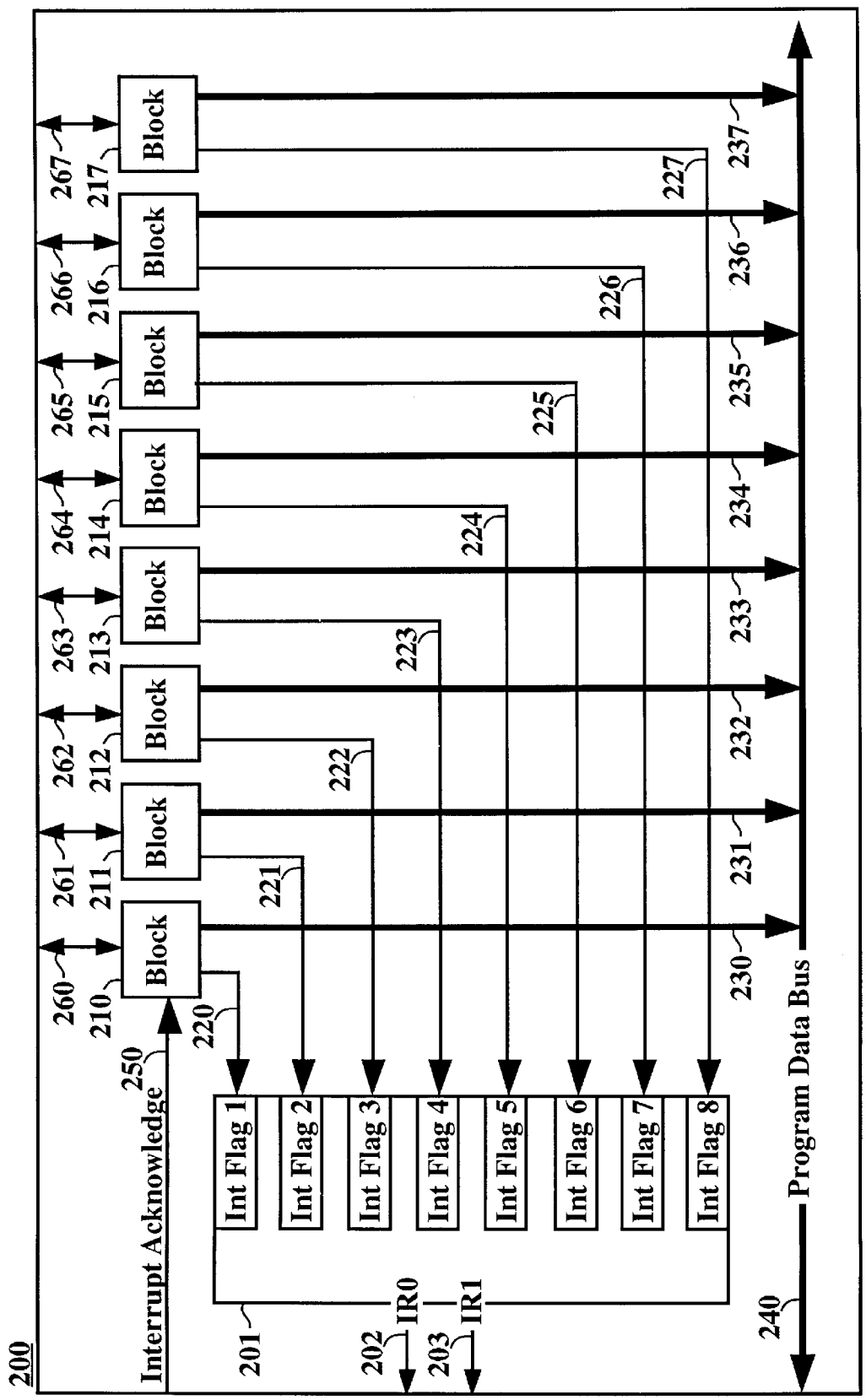
FIG. 2 shows a modular interrupt controller in accordance with one embodiment of the present invention.

With reference now to FIG. 2, a modular interrupt controller 200 in accordance with one embodiment of the present invention is shown. The modular interrupt controller 200 of the present invention includes an interrupt control register 201. Modular interrupt controller 200 is coupled to a processor interrupt request line 202 and a processor interrupt request line 203. Interrupt control register 201 includes a plurality of interrupt pending flags, Int Flag 1 through Int Flag 8. Modular interrupt controller 200 also includes a plurality of interrupt blocks 210–217. Each of the interrupt blocks 210–217 are coupled to interrupt control register 201, and a respective Int Flag 1 through Int Flag 8, via internal interrupt request lines 220–227. Each of interrupt blocks 210–217 are coupled to a program data bus 240 via respective bus lines 230–237. Each of interrupt blocks 210–217 are also coupled to a respective peripheral device (shown in FIG. 4) via bus lines 260–267. An interrupt acknowledge line 250 is coupled to interrupt block 210 and is subsequently cascaded to each successive interrupt block (e.g., interrupt blocks 211–217) one after another. The processor interrupt request lines 202 and 203, program data bus 240, and interrupt acknowledge line 250 couple to a digital signal processor (shown in FIG. 4).

The modular interrupt controller 200 of the present invention functions by efficiently coupling a plurality of peripheral devices to a programmable digital processor having a limited number of interrupt request inputs. In the present embodiment, modular interrupt controller 200 couples to a digital signal processor (DSP) having two interrupt request inputs. Each of the interrupt blocks 210–217 are coupled to support a plurality of peripheral devices (shown in FIG. 4). The peripheral devices couple to program data bus 240 via the interrupt blocks 210–217. Thus, for a programmable digital processor having "N" interrupt request inputs, modular interrupt controller 200 functions by extending the N interrupt request inputs to accommodate a number of peripheral devices "M".

In the present embodiment, modular interrupt controller 200 extends N interrupt request inputs to accommodate M peripheral devices, where N equals two and M equals eight. However, it should be appreciated that the modular interrupt controller 200 of the present invention can be readily modified to accommodate systems using programmable digital processors having differing numbers of interrupt request inputs N and differing numbers of peripheral devices M. The two interrupt request inputs are coupled to IR0 and IR1. The eight peripheral devices are coupled respectively to interrupt blocks 210–217.

As described above, the present invention functions by efficiently sharing the interrupt request inputs of a programmable digital processor among a number of peripheral devices. In the present embodiment, a peripheral device (shown in FIG. 4) is coupled to each of interrupt blocks 210–217. When any one of the peripheral devices (e.g., the peripheral device coupled to interrupt block 210) needs to request an interrupt, it asserts an interrupt request to modular interrupt controller 200 by asserting an interrupt request to its respective interrupt block (e.g., interrupt block 210). The interrupt block 210 subsequently asserts an interrupt request via line 220 to interrupt control register 201, where the interrupt request sets Int Flag 1. The interrupt control register 201 then asserts a processor interrupt request via either IR0 or IR1.

Interrupt control register 201 asserts a processor interrupt request in response to receiving an interrupt request from any of the coupled interrupt blocks 210–217. Thus, at any given time there may be several interrupt blocks with interrupts pending. Each interrupt assertion received via interrupt request lines 220–227 sets a corresponding Int Flag 1 through Int Flag 8. Hence, any of interrupt blocks 210–217 with interrupt requests pending will have its corresponding interrupt pending flag set.

The DSP (shown in FIG. 4) receives the processor interrupt request via IR0 or IR1. In the present embodiment, the DSP has two interrupt request inputs coupled to IR0 and IR1 respectively. When the processor interrupt request is received, the DSP interrupts any currently executing program and sends an interrupt acknowledge signal to fetch a vector to an appropriate ISR. An interrupt acknowledge from the DSP is comprised of an assertion of an interrupt acknowledge signal on the interrupt acknowledge line 250 and a predetermined address of a vector to the appropriate ISR. The predetermined address corresponds to a memory location where the vector to the ISR is stored. In the present embodiment, this predetermined address is different depending upon whether the processor interrupt request was received via IR0 or IR1.

The modular interrupt controller 200 of the present invention receives the interrupt acknowledge from the DSP and routes it to the appropriate one of interrupt blocks 210–217 (e.g., interrupt block 210). For example, if interrupt block 210 asserted the interrupt request, interrupt block 210 receives the interrupt acknowledge signal via interrupt acknowledge line 250. At this time, interrupt block 210 recognizes that its interrupt request is being acknowledged. Interrupt block 210 subsequently drives a vector onto the program data bus via bus line 230. This vector codes to an ISR specific to the particular peripheral device to which interrupt block 210 is coupled. Simultaneously, all other devices coupled to program data bus 240, besides the DSP, are tristated. Thus, instead of fetching the vector to the ISR from memory, the DSP fetches the vector from interrupt block 210.

In the case where the interrupt request was asserted by an interrupt block other than interrupt block 210, the interrupt acknowledge signal is cascaded from interrupt block 210, and through each subsequent interrupt block, to the interrupt block which asserted the interrupt request. For example, if the interrupt request was asserted by interrupt block 212, the resulting interrupt acknowledge signal is first received by interrupt block 210. Since interrupt block 210 does not have an interrupt request pending, it "passes" the interrupt acknowledge signal to interrupt block 211. Since interrupt block 211 does not have an interrupt request pending, it passes the interrupt acknowledge signal to on to interrupt block 212. Upon receiving the interrupt acknowledge signal, interrupt block 212 drives its vector onto the program data bus.

In this manner, the interrupt acknowledge signal is cascaded through each of the interrupt blocks 210–217 until it reaches the appropriate interrupt block. Thus, there is a built in "hardware based" priority among interrupt blocks 210–217, in that interrupt block 210 has the highest priority since it is coupled to interrupt acknowledge line 250 closest to the DSP (shown in FIG. 4) while interrupt block 217 has the lowest priority since it is coupled furthest from the DSP. Hence, when there is more than one of interrupt blocks 210–217 with an interrupt request pending, the highest priority interrupt block is serviced first. The lower priority interrupt blocks are successively serviced until each of the pending interrupt requests are satisfied. Because of this, higher priority peripheral devices are coupled to higher priority interrupt blocks (e.g., interrupt block 210) while lower priority peripheral devices are coupled to lower priority interrupt blocks (e.g., interrupt block 217).

The modular interrupt controller 200 of the present invention, however, also supports software based priority in that each of the interrupt blocks 210–217 can be configured to assert a processor interrupt via IR0 or IR1. As described above, in the present embodiment, the DSP (shown in FIG. 4) has two interrupt request inputs coupled to IR0 and IR1 respectively. One of the interrupt request inputs is a low priority request input and the other interrupt request input is a high priority request input. Their relative priority is configurable via software. Thus, each of the interrupt blocks 210–217 can be configured to assert either a low priority processor interrupt request or a high priority processor interrupt request.

As such, in addition to checking whether it has an interrupt request pending, when an interrupt acknowledge is received (e.g., via interrupt acknowledge line 250), each interrupt block determines whether the interrupt acknowledge is of the proper priority. For example, when interrupt block 212 asserts a low priority interrupt request, it subsequently waits for a matching low priority interrupt acknowledge to cascade down from interrupt block 211. If interrupt block 212 receives a high priority interrupt acknowledge from interrupt block 211, the interrupt acknowledge is intended for an interrupt block further down the line (e.g., interrupt block 217). Consequently, interrupt block 212 passes the high priority interrupt acknowledge along to interrupt block 213, and waits for the next interrupt acknowledge. When the next interrupt acknowledge is received from interrupt block 211 and is determined to be a low priority interrupt acknowledge, interrupt block 212 will drive its interrupt vector onto the program data bus 240, since it still has an interrupt pending.

In this manner, the modular interrupt controller 200 of the present invention supports a "software based" priority in addition to hardware based priority. Using the software based priority, an interrupt block coupled further from the DSP (e.g., interrupt block 217) can be serviced prior to interrupt blocks coupled nearer the DSP (e.g., interrupt block 210). Thus, even though a high priority peripheral device may be coupled to a lower priority interrupt block (e.g., interrupt block 217), the high priority peripheral device can still receive interrupt service prior to other peripheral devices if modular interrupt controller 200 is so configured. Having both hardware and software based priority gives the modular interrupt controller 200 of the present invention flexibility in the order peripheral devices are coupled.

The modular interrupt controller 200 of the present invention also supports polled interrupt servicing. With polled interrupt servicing (hereafter referred to as polling), hardware based interrupts via IR0 and IR1 are disabled by the DSP (shown in FIG. 4). In this case, modular interrupt controller 200 enables a software program running on the DSP to check for interrupts by periodically polling the interrupt pending flags of interrupt control register 201. The software program periodically checks the status of Int Flag 1 through Int Flag 8 to determine whether any of them are set. By polling for interrupts in this manner, the software program controls the time at which it is "interrupted". In the present embodiment, when the DSP is polling, the vector to the appropriate ISR is supplied by interrupt control register 201 as opposed to one of interrupt blocks 210–217. Additionally, interrupt control register 201 can be read by an executing ISR to determine whether there is another pending interrupt request.

Figure 3A:
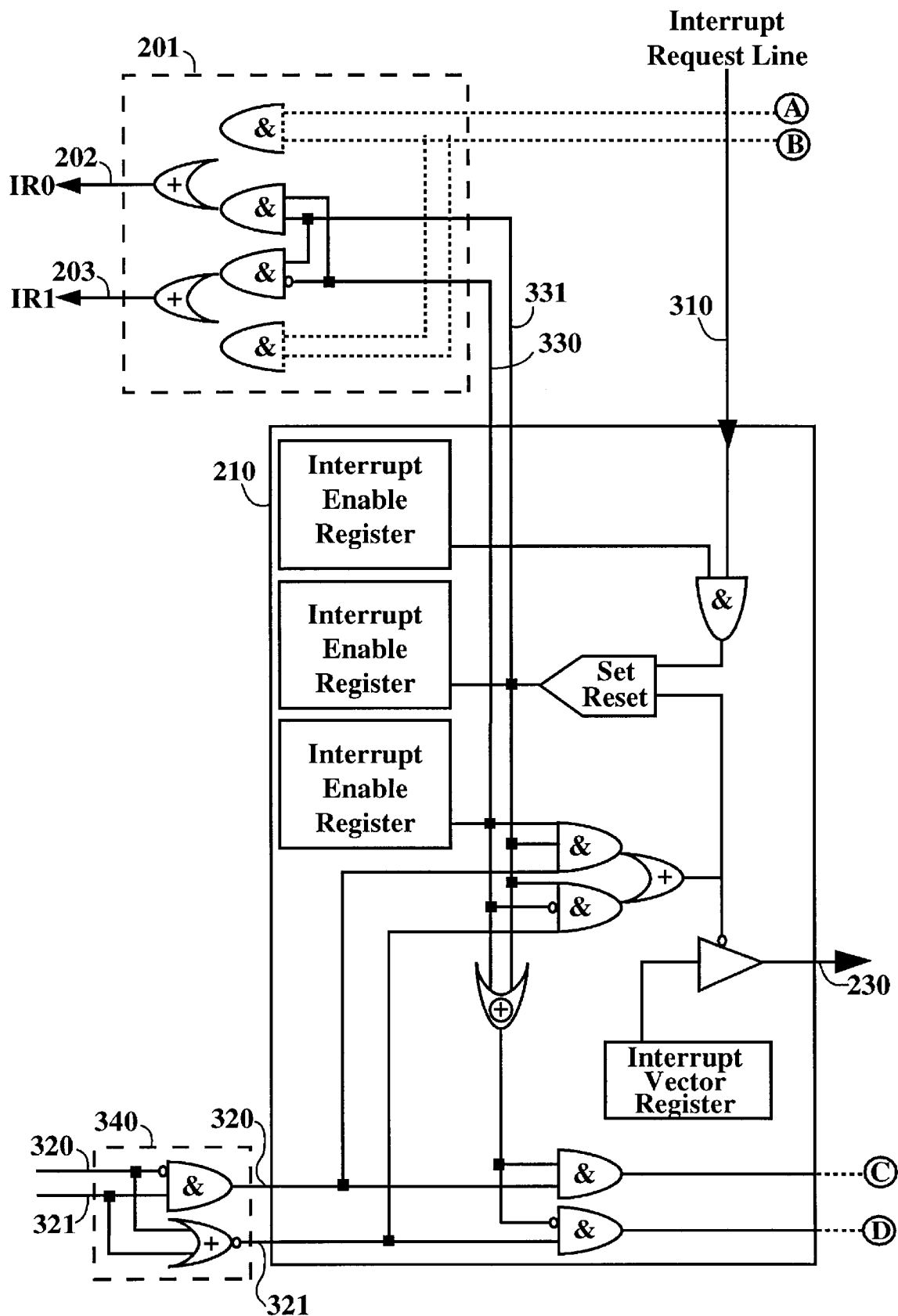
FIG. 3 is a block diagram showing the interrupt logic of a first and second interrupt block in accordance with one embodiment of the present invention.
Figure 3B:
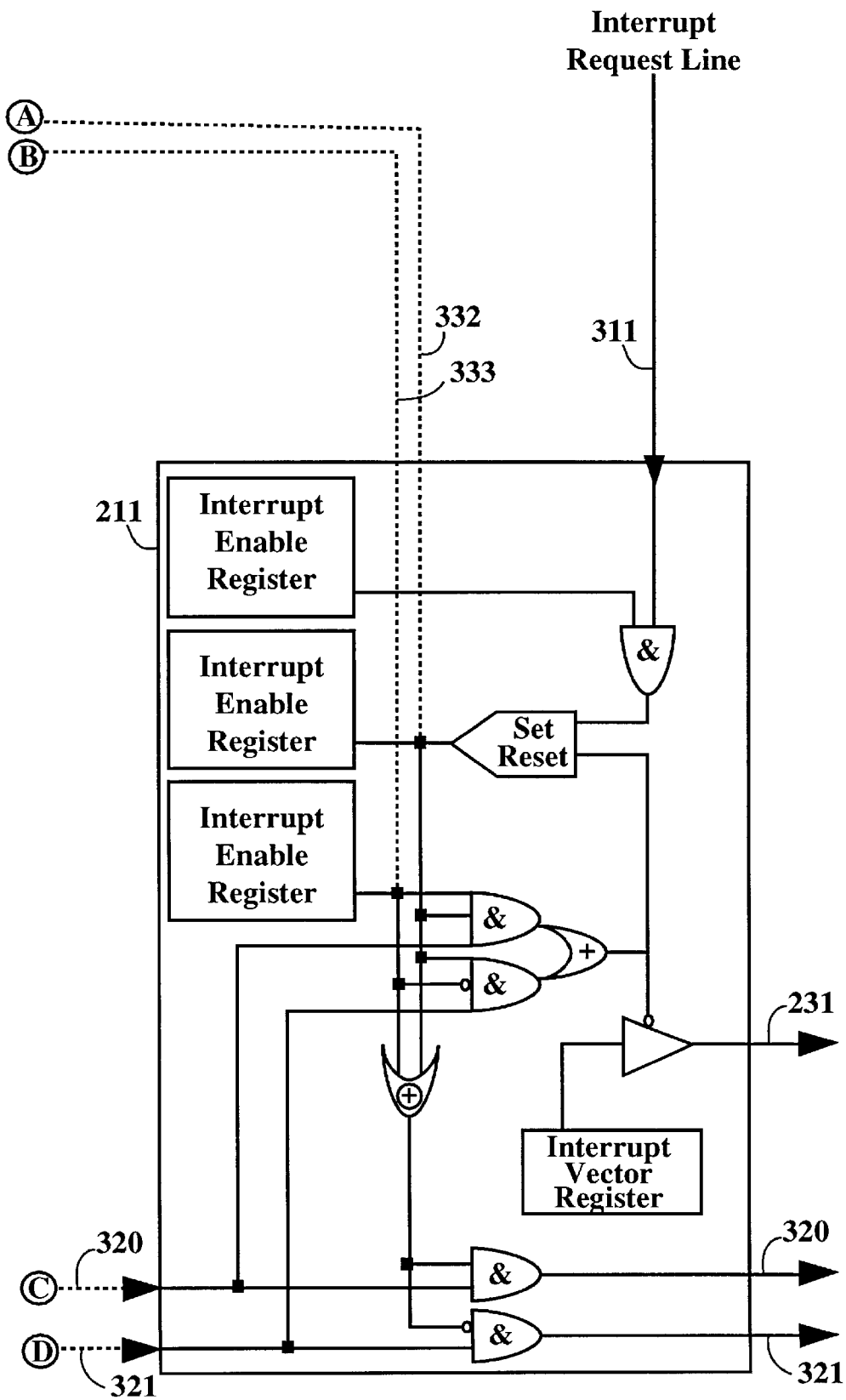

With reference now to FIG. 3, a block diagram 300 showing the interrupt logic of interrupt block 210 and interrupt block 211 in accordance with one embodiment of the present invention is shown. It should be appreciated that the logic shown in diagram 300 is one implementation of the present invention. As such, differing logic configurations, as is well known in the art, can be utilized to implement the same functions without departing the scope of the present invention. In the present embodiment, each of interrupt blocks 210–217 are coupled to a respective peripheral device. Diagram 300 shows interrupt block 210 and interrupt block 211. An interrupt request line 310 and an interrupt request line 311 couple interrupt block 210 and interrupt block 211 to their respective peripheral devices. Interrupt request line 310 comprises a portion of bus line 260 (shown in FIG. 2) and interrupt request line 311 comprises a portion of bus line 261 (shown in FIG. 2). Lines 330 and 331 comprise the internal interrupt request line 220 (shown in FIG. 2) and lines 332 and 333 comprise the internal interrupt request line 221. Both interrupt block 210 and interrupt block 211 include an interrupt enable register, an interrupt status register, an interrupt level register, and an interrupt vector register respectively.

As described above, a peripheral device asserts an interrupt request via its respective interrupt block. Hence, interrupt block 210 and interrupt block 211 both receive interrupt requests via interrupt request line 310 and interrupt request line 311. Interrupt request lines 310 and 311 are coupled to set the interrupt status register of their respective interrupt block.

For example, when an interrupt request is asserted to interrupt block 210 on interrupt request line 310, the interrupt request is coupled with the output of the interrupt enable register to set the interrupt status register. If interrupts are enabled, the interrupt request sets the interrupt status register of interrupt block 210 to an interrupt pending condition. The interrupt enable register thus controls whether interrupt requests will be enabled or disabled, and is configurable via software. The interrupt level register determines whether a high priority or a low priority interrupt request will be asserted, and is also configurable via software. The output of the interrupt level register is coupled to line 330 and the output of the interrupt status register is coupled to line 331. Lines 330 and 331 couple to the logic contained in interrupt control register 201 to assert either a high priority processor interrupt request (e.g., via IR0) or a low priority processor interrupt request (e.g., via IR1), depending upon the output of the interrupt level register of interrupt block 210. The logic in interrupt control register 201 combines the interrupt requests from each of the interrupt blocks 210–217 such that if a low priority interrupt is received from any of interrupt blocks 210–217, the appropriate processor interrupt request line will be asserted (e.g., IR0 for high priority interrupt request and IR1 for low priority interrupt requests).

The corresponding interrupt acknowledge is received from the DSP (shown in FIG. 4) via either line 320 or line 321 via logic 340. Lines 320 and lines 321 comprise interrupt acknowledge line 250 (shown in FIG. 2). In the present embodiment, line 320 conveys a low priority interrupt acknowledge and line 321 conveys a high priority interrupt acknowledge. For example, in the case where interrupt block 210 has asserted a high priority interrupt, the interrupt acknowledge conveyed by lines 320 and 321 is logically combined with the output of the interrupt status register and the interrupt level register in interrupt block 210 such that if the interrupt acknowledge is a low priority interrupt acknowledge, it is passed on to interrupt block 211, and if the interrupt acknowledge is a high priority interrupt acknowledge, the appropriate vector is driven onto the program data bus via bus line 230. Where the interrupt acknowledge priority does not match the priority stored in the interrupt level register, the interrupt acknowledge is passed on to interrupt block 211 via lines 320 and 321. Where the interrupt acknowledge priority matches the priority stored in the interrupt level register and the interrupt status register is set to the interrupt pending condition, the ISR vector stored in the interrupt vector register is driven onto the program data bus 240 (shown in FIG. 2) via bus line 230. Driving the vector via line 230 subsequently resets the interrupt status register to a non-interrupt pending condition.

In the case where the interrupt acknowledge is passed on to interrupt block 211, interrupt block 211 functions similarly to interrupt block 210. The interrupt acknowledge is checked against the interrupt status register and interrupt level register of interrupt block 211. If interrupt block 211 has an interrupt pending and the interrupt acknowledge is of the proper priority, the appropriate vector is driven via bus line 231. Each of interrupt blocks 210–217 function similarly. In this manner, the system of the present invention efficiently shares the two processor interrupt request inputs INT0 and INT1 (shown in FIG. 4) among the plurality of peripheral devices coupled to interrupt blocks 210–217.

Figure 4:
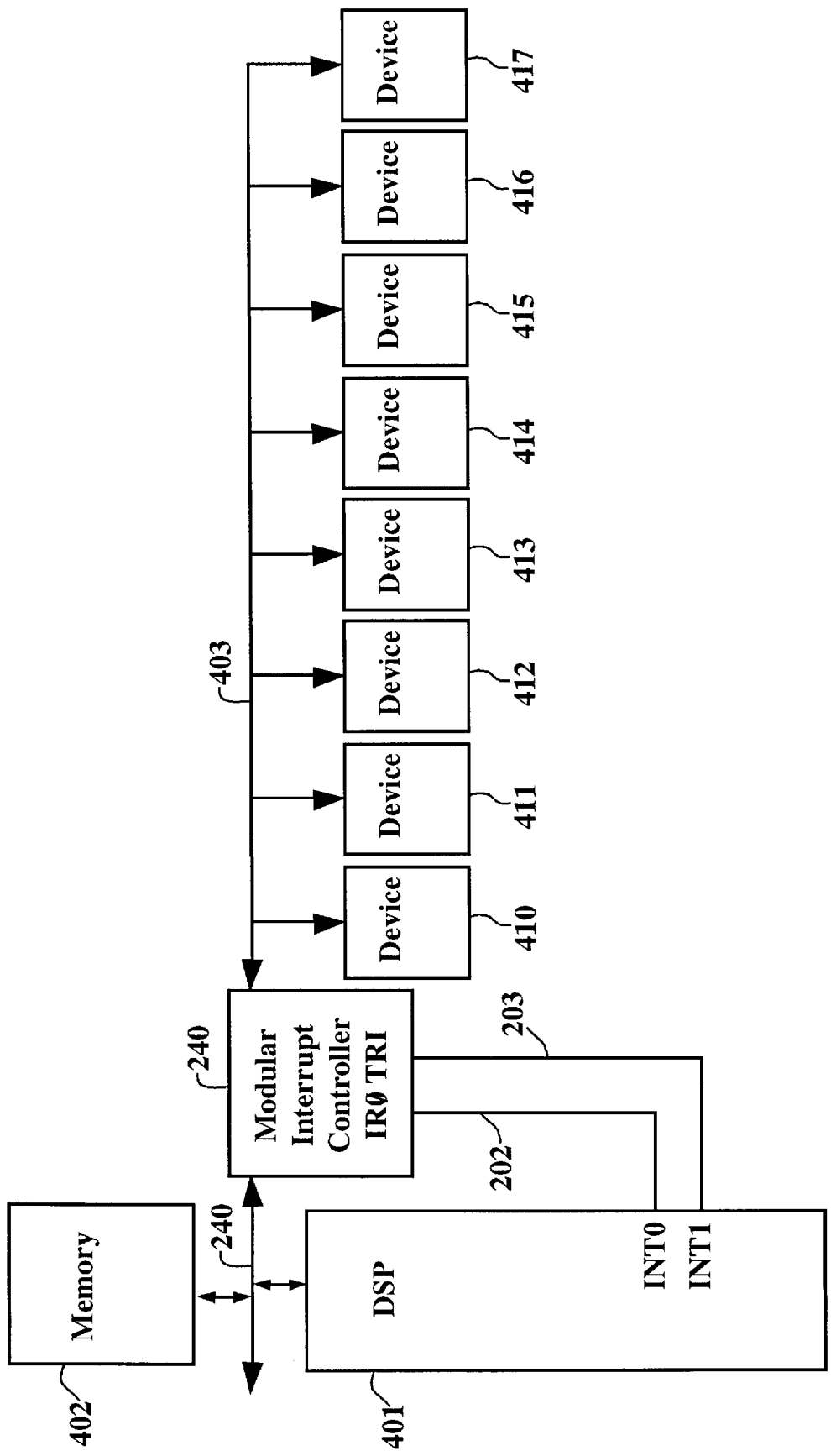
FIG. 4 shows a programmable digital system including a modular interrupt controller of the present invention.

With reference now to FIG. 4, a programmable digital system 400 including the modular interrupt controller 200 of the present invention is shown. In the present embodiment, the programmable digital processor of system 400 is a DSP (e.g., DSP 401). The DSP 401 is coupled to a memory 402 and modular interrupt controller 200 via the program data bus 240. DSP 401 includes two interrupt request inputs, INT0 and INT1. INT0 is coupled to IR0 of modular interrupt controller 200 via processor interrupt request line 202 and INT1 is coupled to IR1 of modular interrupt controller 200 via processor interrupt request line 203. A plurality of peripheral devices 410–417 couple to modular interrupt controller 200 via bus line 403. It should be noted that bus line 403 includes interrupt acknowledge line 250 (shown in FIG. 2) and bus lines 260–267 (shown in FIG. 2). Each of the devices 410–417 are coupled to program data bus 240 via modular interrupt controller 200 as described above.

System 400 functions by fetching program instructions stored in memory 402 and executing them on DSP 401. DSP 401 uses the devices 410–417 for input or output, depending on the particular requirements of the application system 400 is used in. System 400, even though DSP 401 includes only two interrupt request inputs, is able to accommodate input and output among devices 410–417 quickly and efficiently. The modular interrupt controller 200, in accordance with the present invention, efficiently performs input and output among the devices 410–417 by efficiently extending the interrupt servicing capability of DSP 401.

The modular interrupt controller 200 is modular in that a larger number of peripheral devices may be added by increasing the number of interrupt blocks (shown in FIG. 2) included within modular interrupt controller 200. While, in the present embodiment, DSP 401 has only two interrupt request inputs, the present invention can accommodate programmable digital processors having a single interrupt request input. The flexibility of the modular interrupt controller 200 of the present invention provides compatibility with the large number of programmable digital processors in the electronics industry.

It should be appreciated that system 400 can be integrated into a single integrated circuit chip. Thus, even though devices 410–417 are described as peripheral devices, they can readily be integrated into the same integrated circuit die as modular integrated circuit 200, DSP 401, and memory 402. Similarly, modular interrupt controller 200 is well suited for use as a discrete component, where, for example, memory 402, DSP 401, and devices 410–417 are assembled as a circuit board based system.

Figure 5:
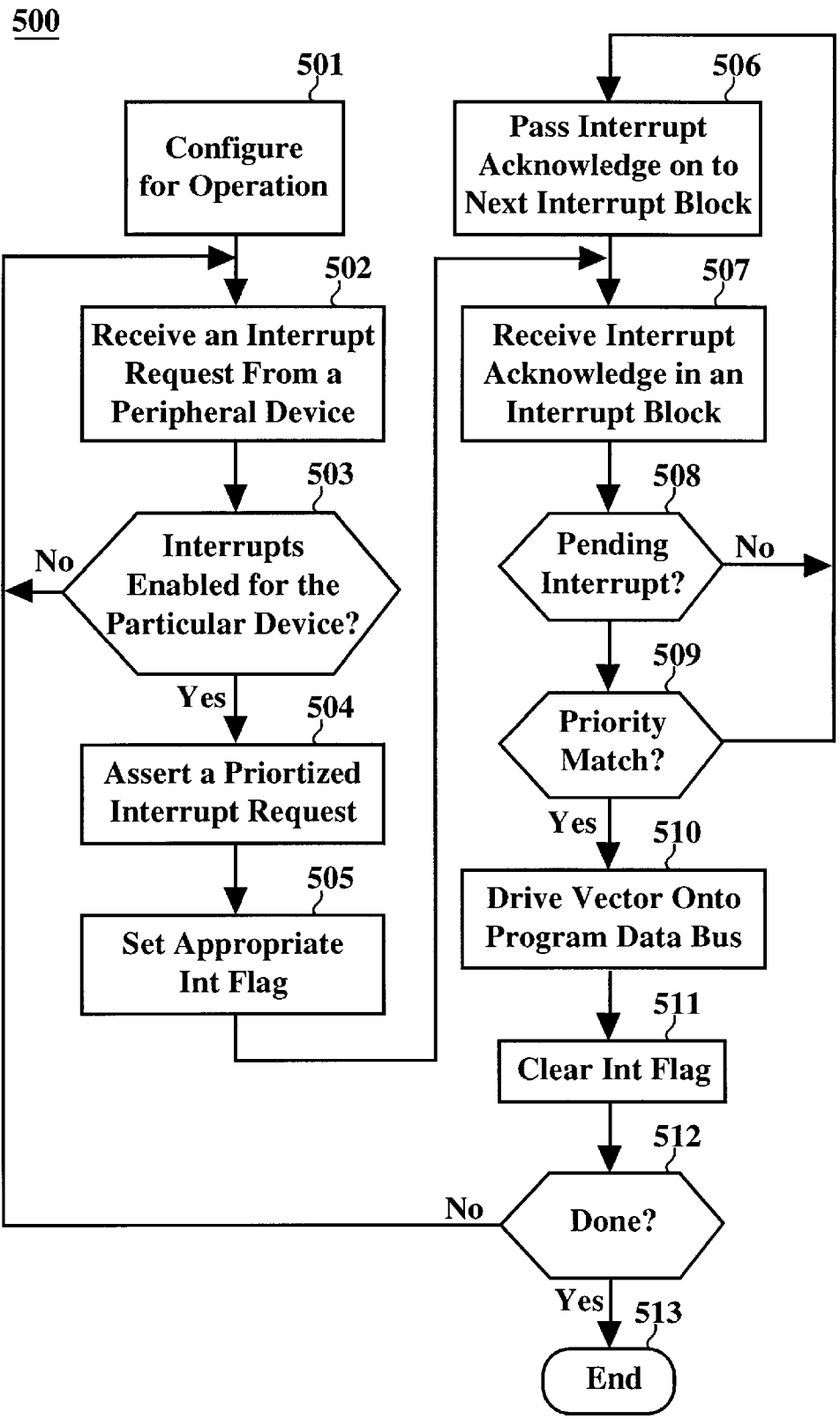
FIG. 5 is a flowchart of the steps of a method in accordance with one embodiment of the present invention.

With reference now to FIG. 5, a flowchart 500 of the steps of a method in accordance with one embodiment of the present invention is shown. Flowchart 500 shows the process followed by a programmable digital processor system incorporating the modular interrupt controller of the present invention.

Flow chart 500 begins in step 501, when a programmable digital processor system in accordance with the present invention (e.g., system 400) is configured for operation. The configuration process includes setting the relative priority between the interrupt request inputs (e.g., INT0 and INT1) of the programmable digital processor (e.g., DSP 401). The configuration process also includes enabling or disabling interrupts in the individual interrupt blocks (e.g., interrupt blocks 210–217 shown in FIG. 2). Enabling interrupts on an interrupt block enables interrupts for the peripheral device coupled to the interrupt block. Similarly, disabling interrupts on an interrupt block disables interrupts for the peripheral device. In addition, each of the interrupt blocks included with modular interrupt controller of the present invention (e.g., modular interrupt controller 200) are configured as to whether they will assert a high priority interrupt or a low priority interrupt, in accordance with the number of interrupt priorities supported in the DSP.

In step 502, the configured system of the present invention receives an interrupt request from a peripheral device. The interrupt request is received in an interrupt block via a bus line (e.g., bus line 260 shown in FIG. 2) coupling the peripheral device to the interrupt block.

In step 503, the interrupt block determines whether it is enabled for interrupts. Each interrupt block is enabled or disabled depending upon the state of its respective interrupt enable register, as described above. The interrupt enable register is configurable via software. If the interrupt block is enabled for interrupts, the process of the present invention proceeds to step 504. If the interrupt block is disabled for interrupts, the process proceeds back to step 502 until another interrupt request is received by any of the other interrupt blocks.

In step 504, the interrupt block receiving the interrupt request from a peripheral device asserts an interrupt request via its respective internal interrupt request line (e.g., internal interrupt request line 220 shown in FIG. 2). As described above, this interrupt request is received by an interrupt control register (e.g., interrupt control register 201) and asserted as a processor interrupt request via IR0 or IR1, depending upon the priority of the interrupt.

In step 505, the appropriate interrupt pending flag (e.g., Int Flag 1) is set in the interrupt control register. By setting an interrupt pending flag, the interrupt control register enables the use of polling, where a programmable digital processor polls the interrupt pending flags of the interrupt control register to detect the presence of interrupts. Polling is typically employed when the programmable digital processor disables its hardware interrupt request inputs, as described above.

The process of the present invention next proceeds to step 507. In step 507, an interrupt acknowledge is received in an interrupt block. As described above, the interrupt acknowledge line is coupled to the nearest interrupt block (e.g., interrupt block 210) and is subsequently cascaded from interrupt block to interrupt block, until the interrupt acknowledge reaches the appropriate interrupt block. If the interrupt acknowledge is not required by one interrupt block, it is passed on to the next interrupt block.

In step 508, the interrupt block receiving the interrupt acknowledge determines whether the interrupt block has an interrupt request pending. If the interrupt block has an interrupt request pending, the process proceeds to step 509. If the interrupt block does not have an interrupt request pending, the process proceeds to step 506, where the interrupt acknowledge signal is passed on to the next interrupt block within the modular interrupt controller.

In step 509, the interrupt block receiving the interrupt acknowledge determines whether the interrupt acknowledge is of the proper priority. In addition to having an interrupt pending, the interrupt block needs to receive an interrupt acknowledge which matches the priority of the interrupt request the interrupt block asserted, as described above. If there is a priority match, the process of the present invention proceeds to step 510. If the priority does not match, the process proceeds back to step 506, where the interrupt acknowledge is passed on to the next interrupt block within the modular interrupt controller.

In step 510, the vector corresponding to the appropriate ISR is driven onto the program data bus by the interrupt block receiving the interrupt acknowledge. When the interrupt block has an interrupt pending and the interrupt acknowledge priority matches, the interrupt block drives the vector to the ISR onto the program data bus. The programmable digital processor (e.g., DSP 401) subsequently fetches the vector, jumps to the starting address of the ISR, and begins execution.

In step 511, the interrupt block, having driven the vector onto the program data bus, clears its internal interrupt status register. The interrupt pending flag in the interrupt control register is also cleared. Thus, the interrupt block is ready to respond to another interrupt request from its coupled peripheral device (e.g., device 410 shown in FIG. 4).

In step 512, if the system of the present invention continues operation, the process proceeds back to step 502 to receive another interrupt request from a peripheral device. Otherwise, the process proceeds to step 513 and ends.

Thus, the present invention provides a method and system for expanding the number of peripheral devices able to efficiently couple to a programmable digital processor system having a limited number of interrupt request inputs. The system of the present invention is compatible with the large number of programmable digital processors in the electronics industry. In addition, the present invention is modular and easily expandable system able to accommodate differing numbers of peripheral devices.

The present invention, a modular interrupt controller, is thus disclosed. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An interrupt controller for use with a programmable digital processor system comprising:

a plurality of interrupt blocks for coupling to a corresponding plurality of peripheral devices;

a data bus coupled to each of said plurality of interrupt blocks;

an interrupt control register coupled respectively to said plurality of interrupt blocks, said interrupt control register for receiving an internal interrupt request from any of said plurality of interrupt blocks and for asserting a processor interrupt request responsive to said internal interrupt request;

a processor interrupt request line adapted to couple to a programmable digital processor, said processor interrupt request line coupled to said interrupt control register such that said interrupt control register asserts an interrupt request to an interrupt request input of said programmable digital processor; and an interrupt acknowledge line adapted to couple to said programmable digital processor, said interrupt acknowledge line coupled to said plurality of interrupt blocks to convey an interrupt acknowledge signal from said programmable digital processor, said interrupt acknowledge line adapted to provide a hardware priority among said plurality of interrupt blocks, wherein said interrupt acknowledge line is cascaded from one of said plurality of interrupt blocks to a successive one of said plurality of interrupt blocks for cascading said interrupt acknowledge signal among said plurality of interrupt blocks such that each of said plurality of peripheral devices efficiently share said interrupt request input.

2. The interrupt controller of claim 1 wherein said cascading of said interrupt acknowledge signal is implemented by coupling said interrupt acknowledge line to said one of said plurality of interrupt blocks, said interrupt acknowledge line further coupled to said successive one of said plurality of interrupt blocks such that said interrupt acknowledge signal is forwarded from said one of said plurality of interrupt blocks to said successive one of said plurality of interrupt blocks to provide said hardware priority.

3. The interrupt controller of claim 1 wherein each of said plurality of interrupt blocks further includes an interrupt level register for asserting a first priority interrupt request or a second priority interrupt request.

4. The interrupt controller of claim 1 wherein said data bus is adapted to couple to said programmable digital signal processor.

5. The interrupt controller of claim 1 wherein said data bus couples to each of said plurality of peripheral devices via said plurality of interrupt blocks respectively.

6. The interrupt controller of claim 1 wherein said interrupt control register includes a plurality of interrupt pending flags, each of said plurality of interrupt pending flags coupled to a respective one of said plurality of interrupt blocks.

7. The interrupt controller of claim 4 wherein said interrupt control register is adapted for polling of said plurality of interrupt pending flags by said programmable digital processor to service said interrupt request.

8. The interrupt controller of claim 1 wherein each of said plurality of interrupt blocks further includes an interrupt enable register for enabling and disabling a peripheral device interrupt request.

9. The interrupt controller of claim 1 wherein each of said plurality of interrupt blocks further includes an interrupt status register for determining whether said peripheral device interrupt request is pending.

10. The interrupt controller of claim 1 wherein each of said plurality of interrupt blocks further includes an interrupt vector register for driving an interrupt vector corresponding to an interrupt service routine for one of said plurality of peripheral devices onto said data bus.

11. A system having a modular interrupt controller and a programmable digital processor, comprising:

a programmable digital processor;

a memory;

a data bus coupling said programmable digital processor and said memory;

a plurality of interrupt blocks coupled to said data bus for coupling to a corresponding plurality of peripheral devices;

an interrupt control register coupled respectively to said plurality of interrupt blocks, said interrupt control register for receiving an internal interrupt request from any of said plurality of interrupt blocks and for asserting a processor interrupt request responsive to said internal interrupt request;

a processor interrupt request line adapted to couple to a programmable digital processor, said processor interrupt request line coupled to said interrupt control register such that said interrupt control register asserts an interrupt request to an interrupt request input of said programmable digital processor; and an interrupt acknowledge line adapted to couple to said programmable digital processor, said interrupt acknowledge line coupled to said plurality of interrupt blocks to convey an interrupt acknowledge signal from said programmable digital processor wherein said interrupt acknowledge line is cascaded from one of said plurality of interrupt blocks to a successive one of said plurality of interrupt blocks for cascading said interrupt acknowledge signal among said plurality of interrupt blocks such that each of said plurality of peripheral devices efficiently share said interrupt request input.

12. The system of claim 11 wherein said data bus is adapted to couple to said programmable digital signal processor.

13. The system of claim 11 wherein said data bus couples to each of said plurality of peripheral devices via said plurality of interrupt blocks respectively.

14. The system of claim 11 wherein said interrupt control register includes a plurality of interrupt pending flags, each of said plurality of interrupt pending flags coupled to a respective one of said plurality of interrupt blocks.

15. The system of claim 14 wherein said interrupt control register is adapted for polling of said plurality of interrupt pending flags by said programmable digital processor to service said interrupt request.

16. The system of claim 11 wherein said interrupt acknowledge line is coupled to one of said plurality of interrupt blocks, said interrupt acknowledge line further coupled to each successive one of said plurality of interrupt blocks such that said interrupt acknowledge signal is cascaded from one of said plurality of interrupt blocks to a second one of said plurality of interrupt blocks, and such that said interrupt acknowledge signal is forwarded from said one of said plurality of interrupt blocks to said successive one of said plurality of interrupt blocks to provide a hardware based priority among said plurality of interrupt blocks.

17. The system of claim 11 wherein each of said plurality of interrupt blocks further includes an interrupt enable register for enabling and disabling a peripheral device interrupt request.

18. The system of claim 11 wherein each of said plurality of interrupt blocks further includes an interrupt status register for determining whether said peripheral device interrupt request is pending.

19. The system of claim 11 wherein each of said plurality of interrupt blocks further includes an interrupt level register for asserting a first priority interrupt request or a second priority interrupt request.

20. The system of claim 11 wherein each of said plurality of interrupt blocks further includes an interrupt vector register for driving an interrupt vector corresponding to an interrupt service routine for one of said plurality of peripheral devices onto said data bus.

21. The system of claim 11 wherein said system is integrated into a single integrated circuit die.

22. In a programmable digital processor integrated circuit system having a modular interrupt controller, a method for sharing an interrupt request input of the programmable digital processor among a plurality of peripheral devices, the method comprising the steps of:

a) receiving an interrupt request from one of said plurality of peripheral devices in one of a plurality of interrupt blocks of a modular interrupt controller, said plurality of peripheral devices respectively coupled to said plurality of interrupt blocks;

b) asserting a processor interrupt request to an interrupt request input of a programmable digital processor via said one of said plurality of interrupt blocks;

c) receiving an interrupt acknowledge in said one of said plurality of interrupt blocks responsive to said processor interrupt request;

d) providing a vector to an interrupt service routine for said one of said plurality of peripheral devices to said programmable digital processor by said one of said plurality of interrupt blocks; and e) cascading said interrupt acknowledge signal is implemented by coupling said interrupt acknowledge line to said one of said plurality of interrupt blocks and a successive one of said plurality of interrupt blocks such that said interrupt acknowledge signal is forwarded from said one of said plurality of interrupt blocks to said successive one of said plurality of interrupt blocks.

23. The method of claim 22 further including the step of configuring said modular interrupt controller for operation.

24. The method of claim 23 further including the step of asserting said processor interrupt request in response to receiving said interrupt request from any of said plurality of peripheral devices in any of said plurality of interrupt blocks.

25. The method of claim 24 further including the steps of:

setting an interrupt pending flag in an interrupt control register corresponding to receiving said interrupt request;

polling said interrupt control register to determine whether a peripheral device interrupt request is pending; and clearing said interrupt pending flag when said peripheral device interrupt request is serviced by said programmable digital processor.

* * * * *